(12) United States Patent  
Veselic

(10) Patent No.: US 7,554,292 B2
(45) Date of Patent: Jun. 30, 2009

(54) BATTERY CHARGER FOR SIMULTANEOUSLY CHARGING A PLURALITY OF BATTERIES

(75) Inventor: Dusan Veselic, Oakville (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

(21) Appl. No.: 11/471,698

(22) Filed: Jun. 21, 2006

(65) Prior Publication Data

US 2008/0007218 A1    Jan. 10, 2008

(51) Int. Cl.
*H02J 7/00*    (2006.01)

(52) U.S. Cl. .................. 320/116; 320/119; 320/124; 320/125

(58) Field of Classification Search ............. 320/119, 320/124, 125
See application file for complete search history.

(56) References Cited

U.S. PATENT DOCUMENTS

| 5,028,859 | A | | 7/1991 | Johnson |
| 5,677,613 | A | * | 10/1997 | Perelle ................. 320/122 |
| 5,780,991 | A | | 7/1998 | Brake |
| 5,905,361 | A | * | 5/1999 | Saeki et al. ............. 320/119 |
| 6,005,368 | A | | 12/1999 | Frame |
| 6,008,623 | A | * | 12/1999 | Chen et al. ............. 320/118 |
| 6,777,913 | B2 | * | 8/2004 | You ..................... 320/125 |
| 7,135,837 | B2 | * | 11/2006 | Patino ................... 320/125 |
| 2001/0010456 | A1 | * | 8/2001 | Kaite et al. ............. 320/125 |
| 2002/0000787 | A1 | * | 1/2002 | Minamiura et al. ...... 320/125 |
| 2003/0160592 | A1 | | 8/2003 | Murakami |
| 2004/0108835 | A1 | | 6/2004 | Kim |

* cited by examiner

*Primary Examiner*—Akm E Ullah
*Assistant Examiner*—Arun Williams
(74) *Attorney, Agent, or Firm*—Heenan Blaikie LLP

(57) ABSTRACT

A battery charger includes a master charge manager, and a slave charge manager coupled to the master charge manager. The master charge manager is coupled to a power source and one battery and is configured to charge the one battery with a first continuously decreasing portion of the available current after a voltage across the one battery exceeds a first predetermined maximum voltage threshold. The slave charge manager is coupled to the power source and another battery and is configured such that, while the master charge manager charges the one battery with the continuously decreasing portion of the available current, the slave charge manager charges the other battery with a continuously increasing portion of the available current. The total of the decreasing portion and the increasing portion are substantially equal to the current available from the power source.

10 Claims, 5 Drawing Sheets

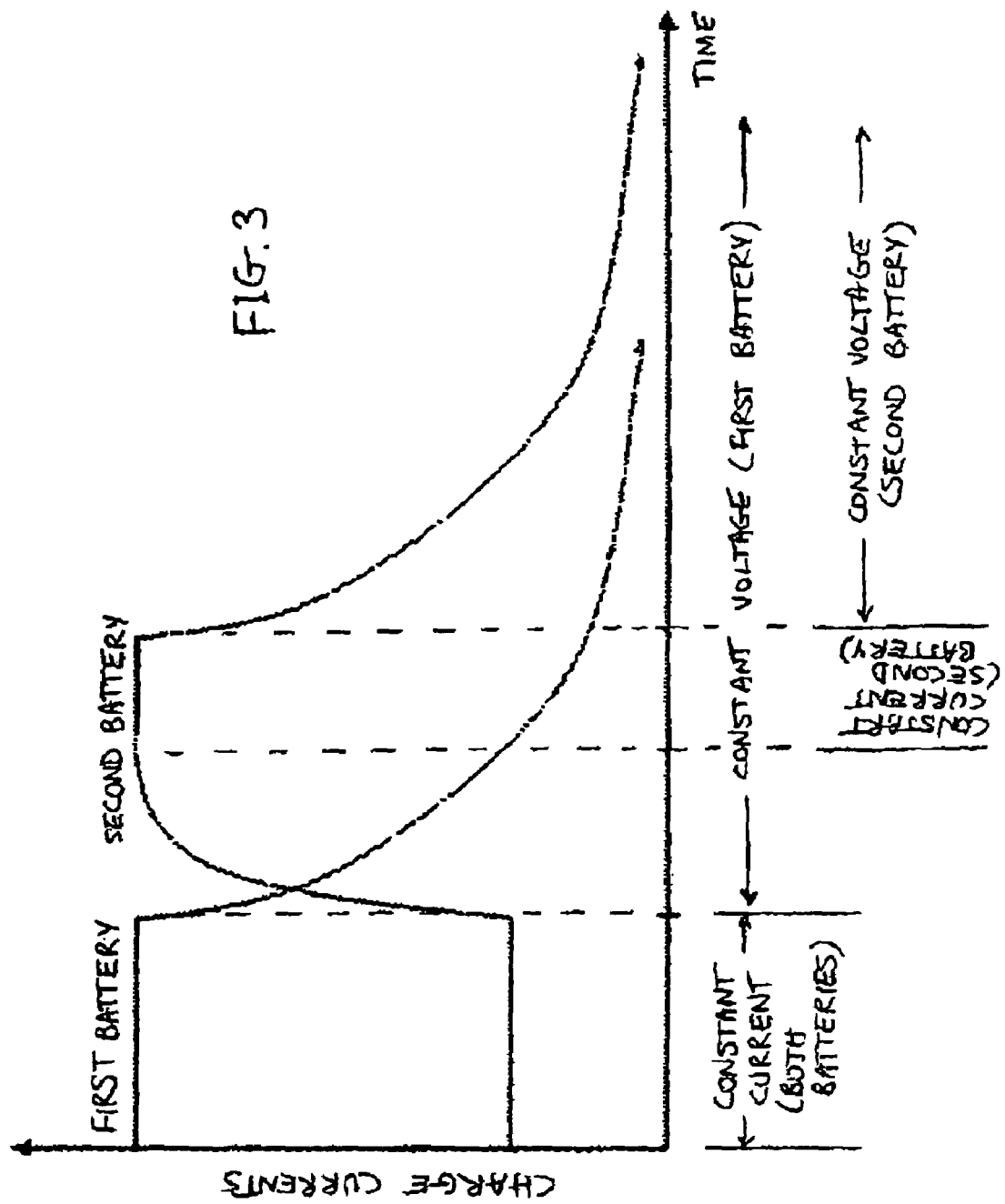

BATTERY CHARGER FOR SIMULTANEOUSLY CHARGING A PLURALITY OF BATTERIES

FIELD OF THE INVENTION

This invention relates to a battery charger. In particular, this invention relates to a method and apparatus for simultaneously charging multiple batteries.

BACKGROUND OF THE INVENTION

It is not uncommon for operators of battery-powered portable communications devices, such as wireless telephones, personal data assistants, wireless pagers, and portable computers, to carry one or more spare batteries to extend the operational time of the device. External-type chargers are popular because they allow the operator to continue using the communications device while the other battery charges. However, typically portable chargers only allow a single battery to be charged at a time. Such "single-capacity" chargers have the obvious disadvantage of requiring lengthy recharge periods, particularly where the operator has multiple spare batteries. Therefore, attempts have been made to provide a battery charger that allows the operator to charge more than one battery at a time.

For instance, Brake (U.S. Pat. No. 5,780,991) describes a battery charger having multiple charging stations. If a battery is inserted in each charging station, each battery is charged in sequence until the voltage of the battery under charge reaches the rated battery voltage.

Johnson (U.S. Pat. No. 5,028,859) describes a battery charger having a pair of charge pockets, one of which is assigned charging priority over the other. If a battery is inserted in each pocket, the battery in the priority pocket is fast charged with a fixed high current until a predetermined voltage is reached. Thereafter, the battery is trickle charged with a fixed low current, and the battery in the non-priority pocket is fast charged with a fixed high current.

Kim (US 2004/0108835) describes a microcomputer-based battery charger having a current source and pair of switching devices for alternately charging a pair of batteries. During a first charging interval, the current source charges the first battery via the first switching device until the voltage of the first battery reaches a predetermined level (e.g. 70% of full charge). During the next charging interval, the current source charges the second battery via the second switching device until the voltage of the second battery reaches a predetermined level. During subsequent charging intervals, the batteries are again alternately charged to successively higher voltage levels.

None of these solutions make optimum use of the available charge current. As a result, charge times are unnecessarily long.

SUMMARY OF THE INVENTION

According to one aspect of the invention described herein, there is provided a battery charger for simultaneously charging multiple batteries from a power source having a finite maximum available current. The battery charger includes a master charge manager for charging a first of the batteries, and a slave charge manager for charging a second of the batteries.

The master charge manager is coupled to the power source and is configured to charge the first battery with a first continuously (analog) decreasing portion of the available current after a voltage across the first battery exceeds a first predetermined maximum voltage threshold. The slave charge manager is coupled to the power source and the master charge manager and is configured such that while the master charge manager charges the first battery with the first continuously decreasing portion of the available current, the slave charge manager charges the second battery with a continuously (analog) increasing portion of the available current. The total of the decreasing portion and the increasing portion is substantially equal to the maximum available current.

In accordance with another aspect of the invention, there is provided a method of simultaneously charging multiple batteries from a power source having a finite maximum available current. The method involves charging a first of the batteries with a first continuously decreasing portion of the available current, while charging a second of the batteries with a continuously increasing portion of the available current. The total of the decreasing portion and the increasing portion are substantially equal to the maximum available current.

In a preferred implementation, the slave charge manager charges the second battery with a second major constant portion of the available current, after a current drawn by the second battery during the continuously increasing charging step exceeds a predetermined maximum current threshold. At the same time, the master charge manager continues to charge the first battery with the first continuously decreasing portion of the available current. The second major constant portion is substantially equal to the predetermined maximum current threshold.

Subsequently, the slave charge manager charges the second battery with a second continuously decreasing portion of the available current, after the voltage across the second battery, during the constant current charging step, exceeds a second predetermined maximum voltage threshold.

Prior to the continuously increasing charging step, however, the master charge manager charges the first battery with a first major constant portion of the available current, while the slave charge manager charges the second battery with a first minor constant portion of the available current. This step continues until the voltage across the first battery exceeds a first predetermined maximum voltage threshold. The total of the major portion and the minor portion is substantially equal to the maximum available current.

Preferably, the battery charger includes a cross-over controller coupled to the charge managers. The cross-over controller continuously determines the portion of the available current that is remaining, based on the current drawn by the first battery from the master charge manager. The cross-over controller also directs the slave charge manager to charge the second battery with the continuously increasing portion of the available current based on the determined remaining portion of the available current.

Further, preferably the battery charger includes a status resistor coupled to the master charge manager, configured such that the magnitude of the current applied to the first battery is proportional to the magnitude of current drawn by the status resistor. The cross-over controller is also configured to direct the slave charge manager to charge the second battery with the second major constant current portion after the voltage across the status resistor drops below a predetermined status voltage limit.

BRIEF DESCRIPTION OF THE DRAWINGS

The invention will now be described in detail, by way of example only, with reference to the accompanying drawings, in which:

FIG. 3 is a diagram that depicts the resulting charge profiles for the first and second batteries.

DETAILED DESCRIPTION OF THE PREFERRED EMBODIMENT

Figure 1:
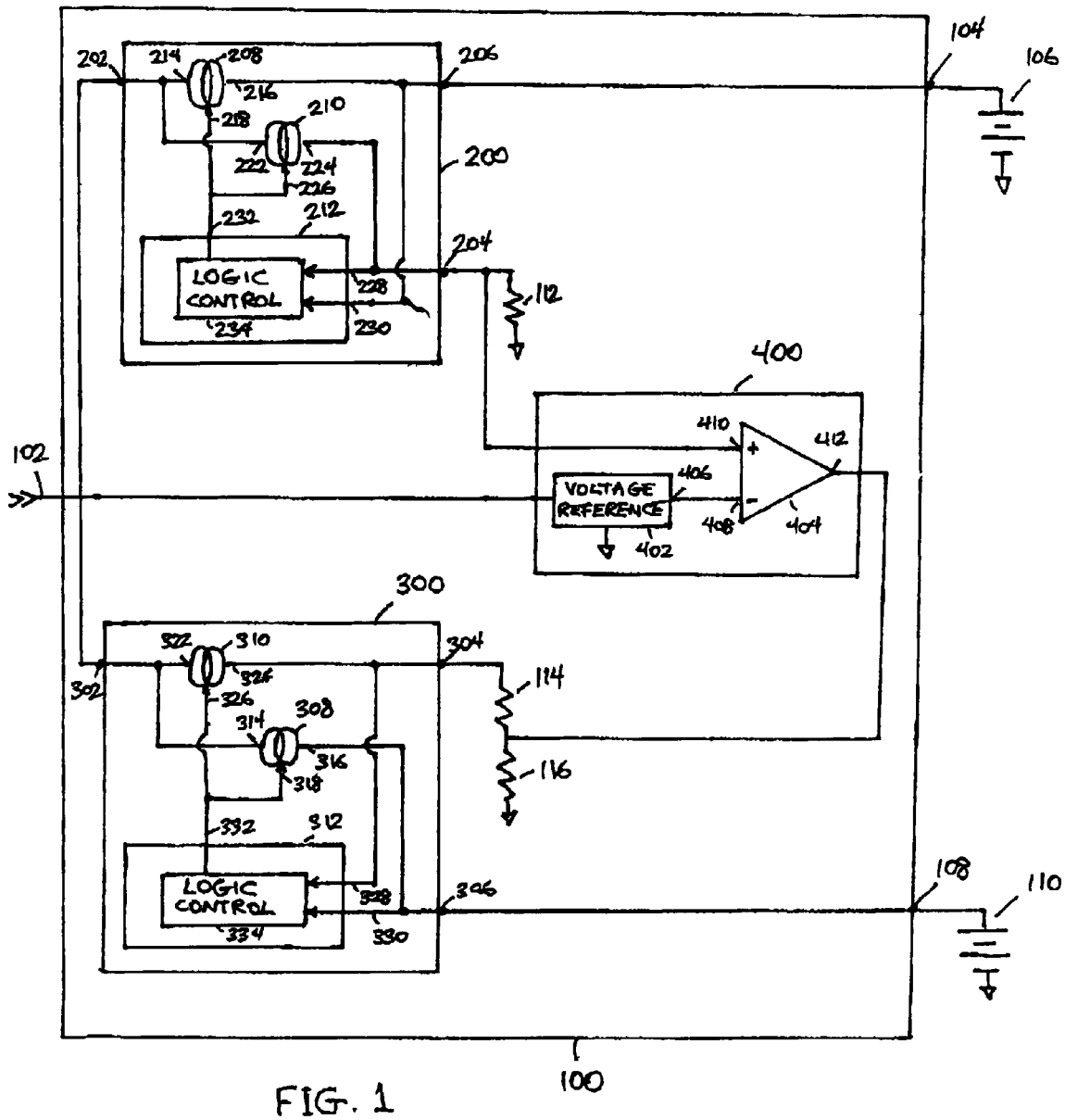
FIG. 1 is a schematic diagram of the battery charger connected to the first and second batteries, and depicts the master charge manager, the slave charge manager and the cross-over controller.

Referring now to FIG. 1, there is shown a battery charger, denoted generally as 100, provided according to the invention. The battery charger 100 includes a DC voltage input 102 for connection to a DC power source having a finite maximum available current limit, a first charge terminal 104 for connection to a first battery 106, a second charge terminal 108 for connection to a second battery 110, a master charge manager 200 for charging the first battery 106, and a slave charge manager 300 for charging the second battery 110.

Master Charge Manager 200

The master charge manager 200 has a power input 202, a load status pin 204, and a battery output 206. The master charge manager 200 is connected at its power input 202 to the DC voltage input 102, and is connected at its battery output 206 to the first charge terminal 104. In addition, the battery charger 100 includes a status resistor 112 connected to the load status pin 204.

The master charge manager 200 includes a primary controlled current/voltage source 208, a secondary controlled current/voltage source 210, and a source controller 212 for controlling the current/voltage sources 208, 210.

The primary current/voltage source 208 includes a voltage input 214, a charge output 216, and a control input 218 which controls the current output by the current/voltage source 208. The primary current/voltage source 208 is connected at its voltage input 214 to the power input 202, and is connected at its charge output 216 to the battery output 206.

The secondary current/voltage source 210 includes a voltage input 222, a charge output 224, and a control input 226 which controls the current output by the current/voltage source 210. The secondary current/voltage source 210 is connected at its voltage input 222 to the power input 202, and is connected at its charge output 224 to the load status pin 204.

The source controller 212 includes a load sensor input 228, a battery sensor input 230, and a control output 232. The source controller 212 is connected at its load sensor input 228 to the load status pin 204, and is connected at its battery sensor input 230 to the battery output 206. The source controller 212 is also connected at its control output 232 to the control input 218 of the primary current/voltage source 208, and to the control input 226 of the secondary current/voltage source 210. The source controller 212 also includes control logic 234 that controls the signal output on the control output 232.

The control logic 234 is configured such that the magnitude of the current output by the primary current/voltage source 208 and the secondary current/voltage source 210 is proportional to the voltage at the load sensor input 228. However, to limit the current draw from the DC power source, preferably the control logic 234 and/or the current/voltage sources 208, 210 are configured such that the magnitude of the current output by the secondary current/voltage source 210 is a small constant fraction of the magnitude of the current output by the primary current/voltage source 208.

The control logic 234 is also configured to provide the master charge controller 200 with two master charge modes. For convenience, these master charge modes will be discussed under the heading "Method of Operation".

Slave Charge Manager 300

The slave charge manager 300 has a power input 302, a load status pin 304, and a battery output 306. The slave charge manager 300 is connected at its power input 302 to the DC voltage input 102, and is connected at its battery output 306 to the second charge terminal 108. In addition, the battery charger 100 includes a pair of series-connected status resistors 114, 116 that are connected to the load status pin 304.

The slave charge manager 300 includes a primary controlled current/voltage source 308, a secondary controlled current/voltage source 310, and a source controller 312 for controlling the current/voltage sources 308, 310.

The primary current/voltage source 308 includes a voltage input 314, a charge output 316, and a control input 318 which controls the current output by the current/voltage source 308. The primary current/voltage source 308 is connected at its voltage input 314 to the power input 302, and is connected at its charge output 316 to the battery output 306.

The secondary current/voltage source 310 includes a voltage input 322, a charge output 324, and a control input 326 which controls the current output by the current/voltage source 310. The secondary current/voltage source 310 is connected at its voltage input 322 to the power input 302, and is connected at its charge output 324 to the load status pin 304.

The source controller 312 includes a load sensor input 328, a battery sensor input 330, and a control output 332. The source controller 312 is connected at its load sensor input 328 to the load status pin 304, and is connected at its battery sensor input 330 to the battery output 306. The source controller 312 is also connected at its control output 332 to the control input 318 of the primary current/voltage source 308, and to the control input 326 of the secondary current/voltage source 310. The source controller 312 also includes control logic 334 that controls the signal output on the control output 332.

The control logic 334 is configured such that the magnitude of the current output by the primary current/voltage source 308 and the secondary current/voltage source 310 is proportional to the voltage at the load sensor input 328. However, to limit the current draw from the DC power source, preferably the control logic 334 and/or the current/voltage sources 308, 310 are configured such that the magnitude of the current output by the secondary current/voltage source 310 is a small constant fraction of the magnitude of the current output by the primary current/voltage source 308.

The control logic 334 is also configured to provide the slave charge controller 300 with four slave charge modes. For convenience, these slave charge modes will be discussed under the heading "Method of Operation".

Cross-Over Controller 400

Preferably, the battery charger 100 includes a cross-over controller 400 connected between the master charge manager 200 and the slave charge manager 300. Alternately, the functionality (discussed below) of the cross-over controller 400 may be incorporated into the master charge manager 200 or the slave charge manager 300, thereby allowing the slave charge manager 300 to be connected directly to the master charge manager 200.

The cross-over controller 400 includes a voltage reference 402 and a differential amplifier 404. The voltage reference 402 has a regulated DC voltage output 406, and is connected at its input to the DC voltage input 102 of the battery charger 100. The differential amplifier 404 has an inverting input 408, a non-inverting input 410, and an open-collector signal output 412. The inverting input 408 is connected to the regulated voltage output 406 of the voltage reference 404, and the non-inverting input 410 is connected to the load status pin 204 of the master charge manager 200. The signal output 412 is connected to the junction of the status resistors 114, 116.

As will become apparent, by monitoring the current drawn by the first battery 106 from the master charge manager 200, the cross-over controller 400 provides an analog (non-discrete) mechanism that continuously determines the magnitude of the current that is available to be drawn from the DC power source, and directs the slave charge manager 300 to charge the second battery 110 with the current available from the DC power source. To achieve this result, the differential amplifier 404, in conjunction with the status resistors 114, 116, continuously varies the resistance seen by the load status pin 304 of the slave charge manager 300, based on the difference between the voltage across the status resistor 112 and the voltage at the regulated DC voltage output 406, thereby causing the slave charge manager 300 to continuously vary the charge current applied to the second battery 110 in accordance with the charge current drawn by the first battery 106.

Method of Operation

As will become apparent, an advantageous feature of the battery charger 100 is that it charges the first battery 106 with a first continuously decreasing portion of the maximum current available from the DC power source, while simultaneously charging the second battery 110 with a continuously increasing portion of the available current. In this phase, the total of the decreasing portion and the increasing portion is substantially equal to the maximum available current.

More particularly, the master charge manager 200 charges the first battery 100 with the first continuously decreasing portion of the available current, after the voltage across the first battery exceeds a first predetermined maximum voltage threshold. Concurrently, the slave charge manager 300 charges the second battery 110 with a continuously increasing portion of the available current. Since the total of the decreasing portion and the increasing portion is substantially equal to the maximum available current, more efficient use is made of the current capacity of the DC power source.

Figure 2A:
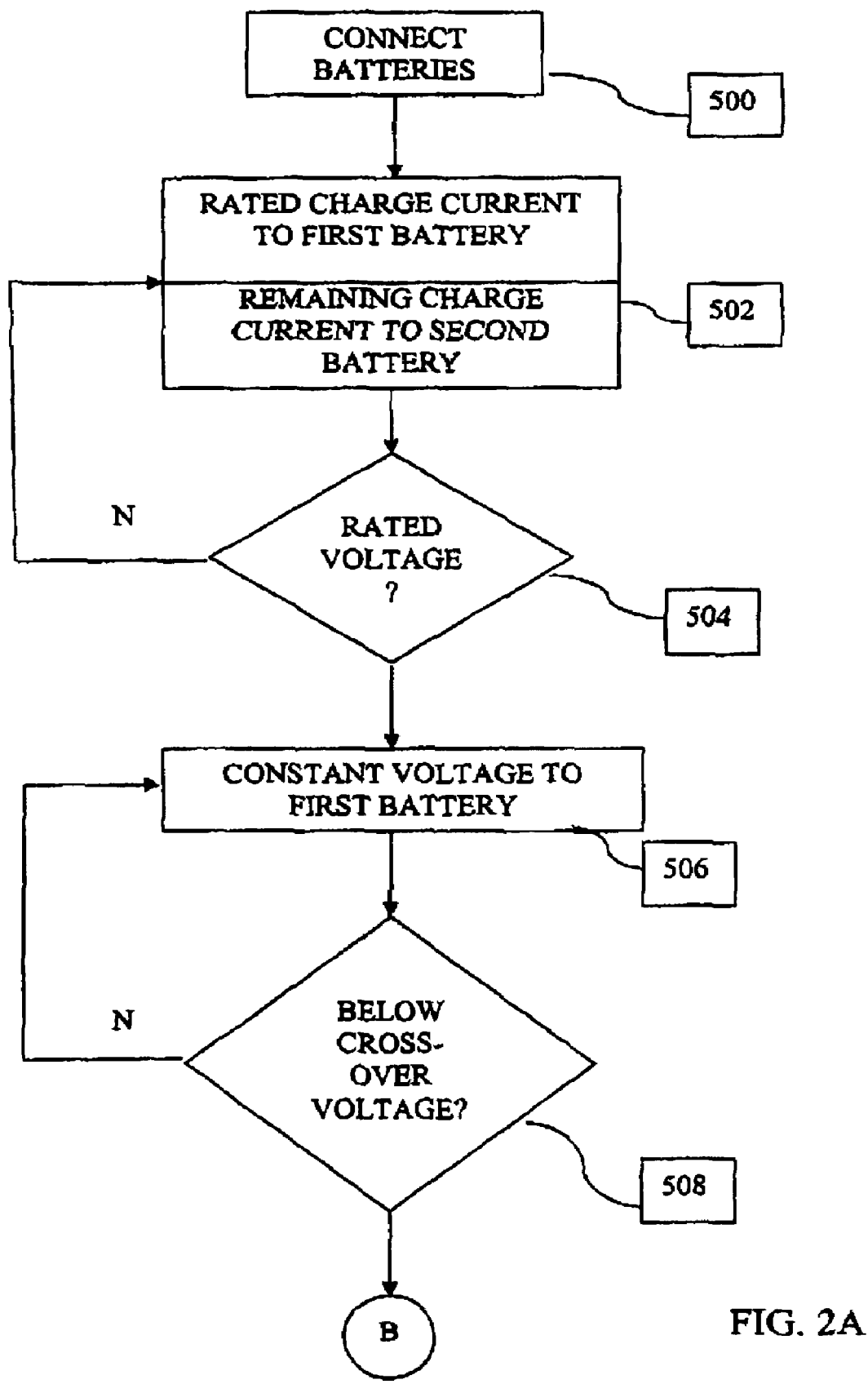
FIGS. 2A and 2B together comprise a flowchart that depicts the method of operation of the battery charger.
Figure 2B:
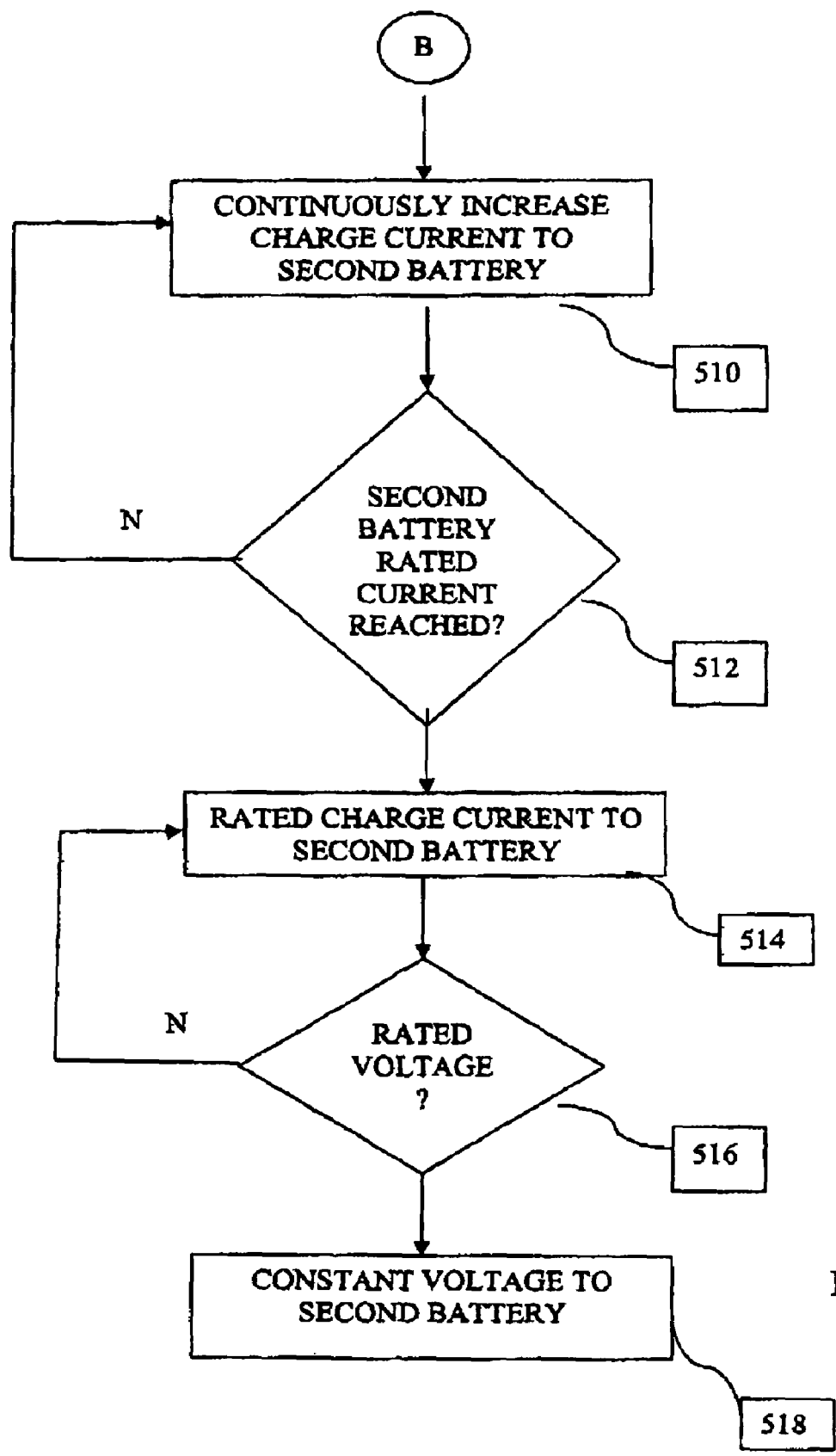

The operation of the battery charge 100 will now be explained in greater detail with reference to FIGS. 2A, 2B and 3.

At the commencement of a charge operation, at step 500, the batteries 106, 110 are connected to the respective charge terminals 104, 108, and the DC power source is connected to the DC voltage input 102. Upon application of the DC power, at step 502, the master charge manager 200 enters the first master charge mode, and the slave charge manager 300 enters the first slave charge mode.

In the first master charge mode, the master charge manager 200 charges the first battery 106 with a substantially constant charge current, and applies a substantially constant load current to the load status pin 204. The magnitude of the constant charge current applied to the first battery 106 in the first master charge mode equals the rated charge current for the first battery 106. Typically, this charge current constitutes a major portion of the current available from the DC power source.

Since the load sensor input 228 of the source controller 212 is connected to the load status pin 204, the magnitude of the constant charge current in the first master charge mode is inversely proportional to the resistance of the status resistor 112. Therefore, the resistance of the status resistor 112 is selected such that, when the master charge manager 200 is in the first master charge mode, the master charge manager 200 charges the first battery 106 with a major portion of the current available from the DC power source.

Concurrently, in the first slave charge mode, the slave charge manager 300 charges the second battery 110 with a substantially constant charge current, and applies a substantially constant load current to the load status pin 304. In view of the limited current available form the DC power source, and current drawn by the first battery 106, the magnitude of the constant charge current applied to the second battery 110 in the first slave charge mode is less than the rated charge current for the first battery 106 and constitutes a minor portion of the current available from the DC power source.

Since the load sensor input 328 of the source controller 312 is connected to the load status pin 304, the magnitude of the constant charge current in the first slave charge mode is inversely proportional to the resistance seen at the load status pin 304. Further, the voltage reference 402 is configured such that, in the first master charge mode, the regulated output voltage at the DC voltage output 406 is less than the resulting voltage across the status resistor 112. As a result, in the first master charge mode, the signal output 412 of the differential amplifier 404 is kept in a high impedance state, which causes the combined resistance of the status resistors 114, 116 to appear at the load status pin 304. Therefore, the resistances of the status resistors 114, 116 are selected such that, when the master charge manager 200 charges the first battery 106 with a major portion of the current available from the DC power source (the rated charge current for the first battery 106), the current drawn by the slave charge manager 300 from the DC power source does not exceed the remaining portion of the current available from the DC power source. Instead, the total of the charge current applied to the first battery 106 and the charge current applied to the second battery 110 is typically substantially equal to the maximum current available from the DC power source.

As shown by step 504, the master charge manager 200 maintains the first master charge mode until the voltage at the battery sensor input 230 reaches a predetermined limit, typically the rated voltage for the first battery 106. Thereafter, at step 506, the master charge manager 200 exits the first master charge mode and enters the second master charge mode.

In the second master charge mode, the master charge manager 200 charges the first battery 106 with a substantially constant voltage. Due to the capacitance of the first battery 106, the magnitude of the charge current to the first battery 106 in the second master charge mode decreases exponentially. To maintain the charge voltage constant, the control logic 234 of the source controller 212 of the master charge manager 200 monitors the battery voltage of the first battery 106 (via the battery sensor input 230) and adjusts the charge current output by the primary current/voltage source 208 accordingly. The source controller 212 makes corresponding adjustments to the current output by the secondary current/voltage source 210. Accordingly, in the second master charge mode, the voltage across the status resistor 112 also decreases exponentially, leveling out a minimum voltage when the first battery 106 becomes fully charged.

As shown by step 508, the slave charge manager 300 continues to charge the second battery 110 with the remaining (minor) portion of the available current until the voltage across the status resistor 112 (which appears at the non-inverting input 410 of the differential amplifier 404) drops below the regulated output voltage at the DC voltage output 406 ("cross-over voltage"). Thereafter, at step 510, the slave charge manager 300 exits the first slave charge mode and enters the second slave charge mode.

As the voltage across the status resistor 112 continues to drop below the cross-over voltage (due to the diminishing charge current drawn by the first battery 106), the output impedance at the signal output 412 of the differential amplifier 404 diminishes, based on the difference between the output voltage at the DC voltage output 406 and the voltage across the status resistor 112. The resistance seen at the load status pin 304 diminishes accordingly.

As a result, the magnitude of the charge current applied by the slave charge manager 300 to the second battery 110, in the second slave charge mode, increases based on the difference between the output voltage at the DC voltage output 406 and the voltage across the status resistor 112. The magnitude of the charge current applied to the second battery 110 increases, at an exponentially-decreasing rate, due to the exponentially diminishing charge current drawn by the battery 106.

As discussed above, the magnitude of the charge current drawn by the first battery 106 is proportional to the voltage across the status resistor 112. The magnitude of the charge current drawn by the second battery 110 is proportional to the voltage at the load status pin 304, which in turn is based on the difference between the output voltage at the DC voltage output 406 and the voltage across the status resistor 112. Therefore, by appropriately setting the regulated output voltage at the DC voltage output 406, the cross-over controller 400 is able to continuously determine the magnitude of the current that is available to be drawn from the DC power source, and to prevent the current drawn by the second battery 110 in the second slave charge mode from exceeding the total remaining current available from the DC power source. Instead, the total of the charge current applied to the first battery 106 and the charge current applied to the second battery 110, in this mode, is typically substantially equal to the maximum current available from the DC power source.

As shown by step 512, the slave charge manager 300 continues to increase the charge current to the second battery 110 (and the output impedance at the signal output 412 of the differential amplifier 404 will continue to diminish) until only the resistance of the status resistor 114 appears at the load status pin 304. At this point, the slave charge manager 300 exits the second slave charge mode, at step 514, and enters the third slave charge mode.

In the third slave charge mode, the magnitude of the charge current drawn by the second battery 110 is equal to a new maximum constant value that is inversely proportional to the resistance of the status resistor 114. The resistance of the status resistor 114 is selected such that, the magnitude of the constant charge current applied to the second battery 110 in the third master charge mode equals the rated charge current for the second battery 110. Typically, this charge current constitutes a major portion of the current available from the DC power source.

Concurrently, the master charge manager 200 continues to charge the first battery 106 with a substantially constant voltage. In view of the limited current available form the DC power source, and the current drawn by the second battery 110, the magnitude of the constant charge current applied to the first battery 106 in the second master charge mode continues to be a minor portion of the current available from the DC power source. As a result, the current drawn by the master charge manager 200 from the DC power source in the second master charge mode does not exceed the remaining portion of the current available from the DC power source.

As shown by step 516, the slave charge manager 300 continues to charge the second battery 110 with the new constant charge current until the voltage at the battery sensor input 330 reaches a predetermined limit, typically the rated voltage for the second battery 110. Thereafter, at step 518, the slave charge manager 300 exits the third slave charge mode and enters the fourth slave charge mode.

In the fourth slave charge mode, the slave charge manager 300 charges the second battery 110 with a substantially constant voltage. Due to the capacitance of the second battery 110, the magnitude of the charge current in the second master charge mode decreases exponentially. To maintain the charge voltage constant, the control logic 334 of the source controller 312 of the slave charge manager 300 monitors the battery voltage of the second battery 110 (via the battery sensor input 330) and adjusts the charge current output by the primary current/voltage source 308 accordingly. The source controller 312 makes corresponding adjustments to the current output by the secondary current/voltage source 310. Accordingly, in the fourth slave charge mode, the voltage across the status resistor 114 also decreases exponentially, leveling out a minimum value when the second battery 110 becomes fully charged.

The charge profiles for the batteries 106, 110 are shown in FIG. 3.

The following discussion provides an example of the foregoing method. In this example, the DC power source is rated at 5.0 V DC and has a finite maximum available current limit of 1.1 A DC. The first and second batteries 106, 110 are each rated at 4.2 V DC and have a rated constant charge current of 1.0 A DC. The resistance of the status resistor 112, 114, 116, and the regulated output voltage at the DC voltage output 406 are selected such that, when the master charge manager 200 is in the first master charge mode (and the slave charge manager 300 is in the first slave charge mode), the master charge manager 200 draws enough current from the DC power source to apply a constant charge current of 1.0 A DC to the first battery 106, and the slave charge manager 300 does not require more than the remaining available current from the DC power source.

The master charge manager 200 continues to charge the first battery 106 with the constant 1.0 A DC charge current until the voltage across the first battery 106 (measured at the battery sensor input 230) reaches approximately 4.2 V DC. At this point, the master charge manager 200 transitions to the second master charge mode and continues to charge the first battery 106 with a constant voltage of 4.2 V DC. The voltage across the status resistor 112 will decrease, as a result of the decreasing status current.

When the voltage at the non-inverting input 410 of the differential amplifier 404 drops below the regulated output voltage at the DC voltage output 406, the slave charge controller 300 transitions to the second slave charge mode and begins to increase the charge current supplied to the second battery 110. The total of the charge current applied to the first battery 106 and the charge current applied to the second battery 110, in this mode, is typically substantially equal to the maximum current available from the DC power source.

A "cross-over point" will be reached when the current drawn by the first battery 106 equals the current drawn by the second battery 110. Thereafter, the current drawn by the second battery 110 will reach a new maximum threshold value, as determined by the value of status resistor 114. At this point, the slave charge manager 300 transitions to the third master charge mode and continues to charge the second battery 110 with a new constant charge current substantially equal to the new maximum value.

The resistance of the status resistor 114 is selected such that, in the third slave charge mode, the slave charge manager 300 draws enough current from the DC power source to apply a constant charge current of 1.0 A DC to the second battery 110. Due to the continually diminishing current drawn by the first battery 106, the master charge manager 200 will not require more than the remaining available current from the DC power source.

The slave charge manager 300 continues to charge the second battery 110 with this constant charge current until the voltage across the second battery 110 (measured at the battery sensor input 330) reaches approximately 4.2 V DC. At this point, the slave charge manager 300 transitions to the fourth slave charge mode. In this mode, the slave charge manager 300 continues to charge the second battery 110 with a constant voltage of 4.2 V DC.

Exemplary Implementation of Battery Charger

Figure 4:
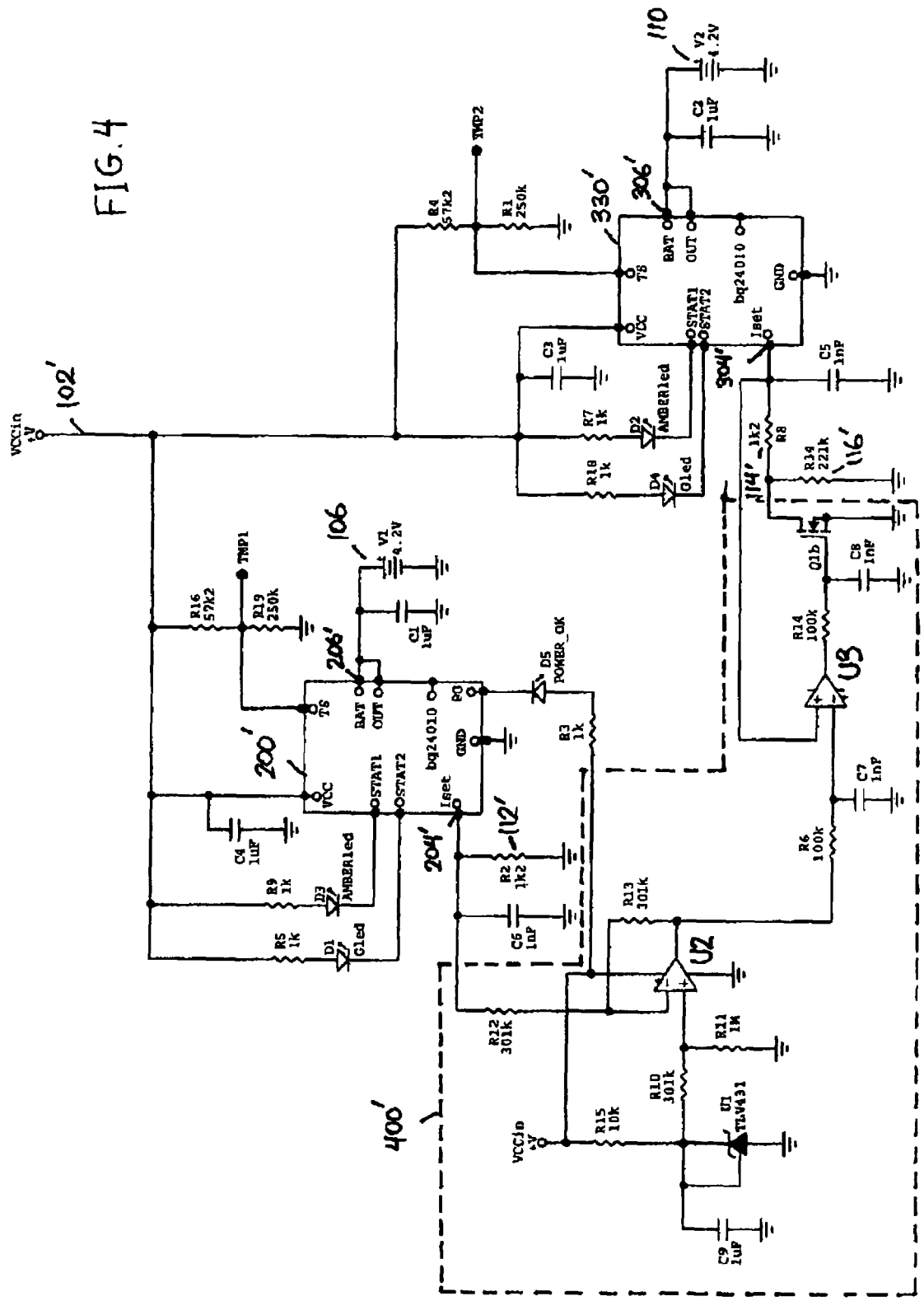
FIG. 4 is a schematic diagram that depicts a preferred implementation of the battery charger.

FIG. 4 depicts an exemplary implementation of a battery charger 100'. Apart from the specific implementation details, the battery charger 100' is substantially identical to the battery charger 100. For ease of understanding, FIG. 4 uses similar reference numerals as in FIG. 1 (denoted with a prime superscript) to refer to the corresponding elements of FIG. 1.

As shown, the master charge manager 200' and the slave charge manager 300' are each implemented with a Texas Instruments BQ2010 integrated circuit, and the batteries 106, 110 are lithium batteries, each rated at 4.2 V. The cross-over controller 400' is implemented with an adjustable voltage regulator U1 (Texas Instruments TLV431), a differential amplifier U2, a voltage follower circuit U3, and a transistor Q1. In the configuration shown, the voltage appearing at the DC voltage input 102 is 5 V DC, 1.1 A DC max. The voltage output by the voltage regulator U1 is approximately 1.24 V DC, and the voltage appearing at the non-inverting input of the differential amplifier U2 is approximately 0.95 V DC due to the voltage divider effect of R10 and R11.

When the master charge manager 200' is in the first master charge mode, and the slave charge manager 300' is in the first slave charge mode, the master charge manager 200' applies a constant charge current to the first lithium battery 106 via the OUT pin, and drives the voltage of its STAT1 pin low, thereby illuminating the AMBER LED D3. In this mode, the master charge manager 200' charges the first battery 106 with a major portion (approx. 837 mA DC) of the current available from the DC power source, with approximately 2.5 mA DC being drawn from the ISET pin.

The voltage at the ISET pin of the master charge manager 200' (approx. 2.5 V DC) will be of sufficient magnitude that the voltage appearing at the inverting input of the differential amplifier U2 is greater than the voltage at the non-inverting input. The output voltage of the differential amplifier U2 will be Vss, the output voltage of the voltage follower U3 will be Vss, and the impedance of the transistor Q1 will be at maximum. The combined resistance of R8, R34 (222 kohm) will appear at the ISET pin of the slave charge manager 300'. Therefore, the slave charge manager 300' charges the second battery 110 with a remaining portion (approx. 3.7 mA DC) of the available current, and drives the voltage of its STAT1 pin low, thereby illuminating the AMBER LED D2.

The master charge manager 200' will continue to charge the first battery 106 with the constant charge current until the voltage of the battery 106, as measured at the BAT pin reaches its rated voltage (4.2 V DC). Thereafter, the master charge manager 200' enters the second master charge mode, during which the battery 106 is charged with a constant voltage (approx. 4.2 V DC). During the second master charge mode, the charge current output at the OUT pin and the status current output at the ISET pin of the master charge manager 200' decrease exponentially.

When the charge current drops below a predetermined minimum value (e.g. 17.5 µV DC), the master charge manager 200' turns off its STAT1 pin, and drives the voltage of its STAT2 pin low, thereby extinguishing the AMBER LED D3 and illuminating the GREEN LED D1.

As the voltage across the status resistor 112' (R2) drops below 1.9 V DC, the voltage appearing at the inverting input of the differential amplifier U2 drops below the voltage at the non-inverting input. At this point, the slave charge manager 300' enters the second slave charge mode.

Thereafter, the output voltage of the differential amplifier U2 will increase (being proportional to the difference between the voltage at the non-inverting input and the voltage at the inverting input). Further, the voltage at the non-inverting input of the voltage follower U3 (and the ISET pin of the slave charge manager 300') will be forced to track the output voltage of the differential amplifier U2 due to the amplification of the voltage follower U3.

To achieve this voltage tracking effect, the impedance through the transistor Q1 will be forced to decrease, thereby causing the resistance appearing at the ISET pin of the slave charge manager 300' to decrease. As a result, the current drawn by the second battery 110 will increase at a rate comparable to the rate of decrease of current drawn by the first battery 106.

The impedance through the transistor Q1 will continue to decrease until only the resistance of R8 (1 kohm) appears at the ISET pin of the slave charge manager 300'. Due to the capacitance of the battery 106, the charge current to the second battery 110 will increase at an exponentially decreasing rate, ultimately leveling out at a magnitude determined by the resistance of R8. At this point, the slave charge manager 300' enters the third slave charge mode.

Thereafter, the slave charge manager 300' will charge the second battery 110 with a major portion (approx. 837 mA DC) of the current available from the DC power source (as determined by R8), with approximately 2.5 mA DC being drawn from the ISET pin. The master charge manager 200' will continue to charge the first battery 106 with an exponentially-decreasing portion of the remainder of the available current.

The slave charge manager 300' will continue to charge the second battery 110 with the constant charge current until the voltage of the battery 110, as measured at the BAT pin reaches its rated voltage (4.2 V DC). At this point, the slave charge manager 300' enters the fourth slave charge mode.

Thereafter, the slave charge manager 300' charges the battery 110 with a constant voltage (approx. 4.2 V DC). During the fourth slave charge mode, the charge current output at the OUT pin and the status current output at the ISET pin of the slave charge manager 300' decrease exponentially.

When the charge current drops below a predetermined minimum value (e.g. 17.5 µV DC), the slave charge manager 300' turns off its STAT1 pin, and drives the voltage of its STAT2 pin low, thereby extinguishing the AMBER LED D2 and illuminating the GREEN LED D4.

The scope of the monopoly desired for the invention is defined by the claims appended hereto, with the foregoing description being merely illustrative of the preferred embodiment of the invention. Persons of ordinary skill may envisage modifications to the described embodiment which, although not explicitly suggested herein, do not depart from the scope of the invention, as defined by the appended claims.

I claim:

1. A battery charger for simultaneously charging a plurality of batteries from a power source having a finite maximum available current, comprising:
   a master charge manager for charging one of the batteries, the master charge manager being coupled to the power source and being configured to charge the one battery with a first continuously decreasing portion of the available current after a voltage across the one battery exceeds a first predetermined maximum voltage threshold;
   a slave charge manager for charging another of the batteries, the slave charge manager being coupled to the power source and the master charge manager; and
   a cross-over controller coupled to the charge managers, the cross-over controller being configured to continuously determine a remaining portion of the available current based on a current drawn by the one battery from the master charge manager, and, while the master charge manager charges the one battery with the first continuously decreasing portion of the available current, to direct the slave charge manager to charge the another battery with a continuously increasing portion of the available current based on the determined remaining portion of the available current, the total of the decreasing portion and the increasing portion being substantially equal to the maximum available current.

2. The battery charger according to claim 1, wherein the slave charge manager is configured to charge the another battery with a second major constant portion of the available current, after a current drawn by the another battery during the continuously increasing charging step exceeds a predetermined maximum current threshold, while the master charge manager continues to charge the one battery with the first continuously decreasing portion of the available current, the second major constant portion being substantially equal to the predetermined maximum current threshold.

3. The battery charger according to claim 2, wherein the slave charge manager is configured to charge the another battery with a second continuously decreasing portion of the available current after a voltage across the another battery during the constant current charging step exceeds a second predetermined maximum voltage threshold.

4. The battery charger according to claim 2, wherein the master charge manager is configured to charge the one battery with a first major constant portion of the available current, prior to the continuously increasing charging step, while the slave charge manager charges the another battery with a minor constant portion of the available current, until a voltage across the one battery exceeds a first predetermined maximum voltage threshold, the total of the first major portion and the minor portion being substantially equal to the maximum available current.

5. The battery charger according to claim 4, further including a status resistor coupled to the master charge manager, configured such that a magnitude of the current applied to the one battery is proportional to a magnitude of current drawn by the status resistor, the cross-over controller being configured to direct the slave charge manager to charge the another battery with the second major constant current portion after a voltage across the status resistor drops below a predetermined status voltage limit.

6. The battery charger according to claim 5, wherein the master charge manager includes a primary controlled current/voltage source coupled to the one battery, a secondary controlled current/voltage source coupled to the status resistor, and a source controller for controlling the current/voltage sources, the source controller being configured to adjust the magnitude of the applied current in accordance with the magnitude of the status resistor current.

7. A method of simultaneously charging a plurality of batteries from a power source having a finite maximum available current via a first charge manager, at a controller the method comprising while charging one of the batteries with a first continuously decreasing portion of the available current, continuously determining a remaining portion of the available current based on the current drawn by the one battery from the first charge manager, and with the controller directing a second charge manager to charging another of the batteries with a continuously increasing portion of the available current based on the determined remaining portion of the available current, the total of the decreasing portion and the increasing portion being substantially equal to the maximum available current.

8. The method according to claim 7, further comprising continuously increasing charging step, after a current drawn by the another battery exceeds a predetermined maximum current threshold, charging the another battery with a second major constant portion of the available current while continuing to charge the one battery with the first continuously decreasing portion of the available current, the second major constant portion being substantially equal to the predetermined maximum current threshold.

9. The method according to claim 8, further comprising, subsequent to the constant charging step, charging the another battery with a second continuously decreasing portion of the available current after a voltage across the another battery exceeds a second predetermined maximum voltage threshold.

10. The method according to claim 8, further comprising, prior to the continuously increasing charging step, charging the one battery with a first major constant portion of the available current, until a voltage across the one battery exceeds a first predetermined maximum voltage threshold, while charging the another battery with a minor constant portion of the available current, the total of the first major portion and the minor portion being substantially equal to the maximum available current.

* * * * *